United States Patent [19]
Hamerlinski

[11] Patent Number: 5,713,967
[45] Date of Patent: Feb. 3, 1998

[54] APPARATUS FOR THE EXTRACTION OF PEAT

[75] Inventor: Waclaw Hamerlinski, Wroclaw, Poland

[73] Assignee: Torf Establishment, Vaduz, Liechtenstein

[21] Appl. No.: 263,660

[22] Filed: Jun. 21, 1994

(Under 37 CFR 1.47)

[30] Foreign Application Priority Data

Jun. 22, 1993 [PL] Poland ........................ 299418

[51] Int. Cl.$^6$ ........................................... C10L 5/00
[52] U.S. Cl. ................ 44/630; 422/275; 422/276; 422/278; 422/279; 422/281; 422/284
[58] Field of Search ................. 44/630; 209/158, 209/173; 422/275, 276, 278, 279, 281, 284

[56] References Cited

U.S. PATENT DOCUMENTS

| | | | |
|---|---|---|---|
| 466,152 | 12/1891 | Blackmore | 422/276 |
| 989,826 | 4/1911 | Thiele | 422/276 |
| 1,319,661 | 10/1919 | Tone | 422/276 |
| 5,290,554 | 3/1994 | Tolpa et al. | 424/195.1 |
| 5,360,117 | 11/1994 | Tolpa et al. | 209/158 |

*Primary Examiner*—Stephen Kalafut
*Assistant Examiner*—Cephia D. Toomer

[57] ABSTRACT

An apparatus for the extraction of peat comprising an outer tank (1) and an inner tank compartment (3) having perforated walls (4,23) and being the actual container for peat to be extracted. Feeding pipes (13) for the supply of extracting medium extend into the inner tank compartment (3) while at least one outflow opening (7–11) is connected to the outer tank (1). Between the inner tank compartment (3) and the outer tank (1), there is a free space (38) filled with extracting medium. Preferably, the medium is supplied to a plurality of orifices within the inner tank compartment (3), and particularly to at least two different levels.

33 Claims, 4 Drawing Sheets

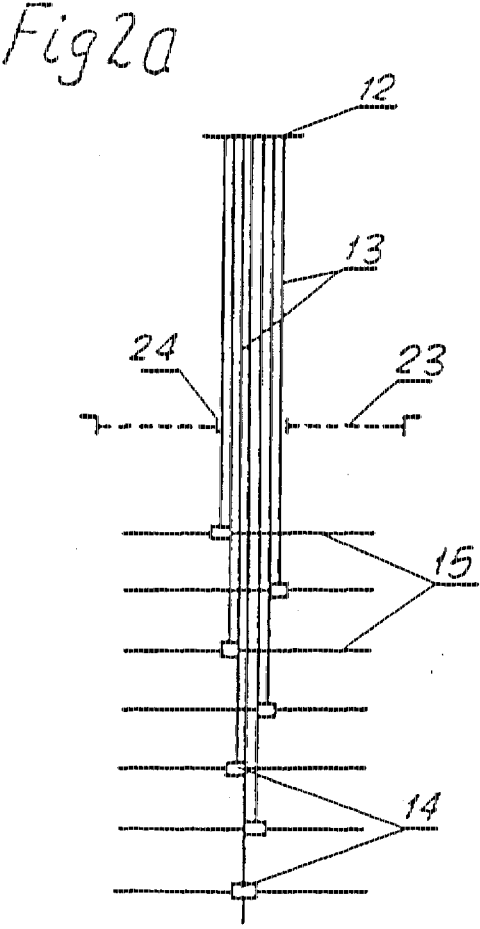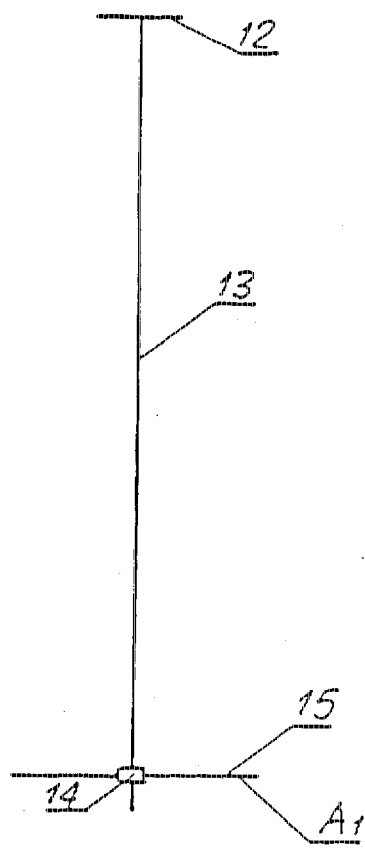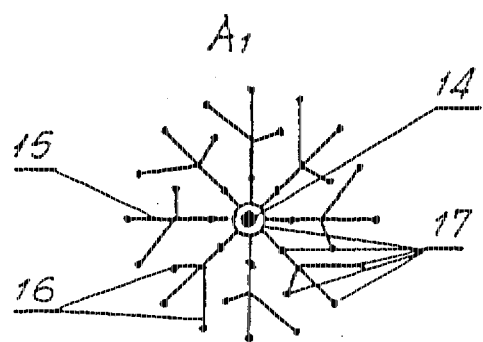

APPARATUS FOR THE EXTRACTION OF PEAT

FIELD OF THE INVENTION

The present invention relates to an apparatus for the extraction of peat and more particularly to an apparatus for the extraction of peat which comprises an extraction tank, a liquid extracting medium feeding pipe system and an extract outflow pipe system.

BACKGROUND OF THE INVENTION

The extraction of large quantities of peat can be done in a static way, but, as will be seen, proved to be unsatisfactory. Static extraction is commonly employed to obtain—from crude products having a loose structure and a rather low degree of comminution—extracts that can easily be washed out in batches by means of a suitable extracting solvent. Static extraction is carried out in extracting tubs, optionally equipped with a mechanical stirrer. Such tubs are loaded with peat and the extracting solvent in whatever sequence. Periodically, the mixture of peat and the solvent may be stirred.

The extracting fluid is kept in contact with the peat material for a time sufficient to obtain a saturated solution of the desired substance or substances in the extracting medium. Then the peat particles are allowed to settle and either the supernatant extract is decanted or the extract is collected from the bottom of the extractor through a screen.

When such a method is applied to a raw, air-dried peat, collection of the extract from the bottom of the extractor is often impossible due to a nearly impermeable layer of mud formed as a result of sedimentation of swollen peat particles.

However, while more intensive stirring of the mixture increases the contact of peat particles with the extracting solvent, this procedure results in dispersion of the mud layer and renders decantation of a clear extract impossible. Sedimentation and swelling of the peat particles cause further problems when discharging the tubs to clean them before the next operating cycle. Neither does the situation improve by charging the tubs firstly with peat and then introducing in the solvent nor by reversing this procedure, i.e. by pouring in the solvent first and then adding the peat.

Furthermore, in the decanting procedure, the desired active substances diffuse into the extracting solvent from the upper levels of the peat bed only which leads to a low concentration in the supernatant fluid and, consequently, to a low efficiency of the extraction process. The desired substances present in deeper layers of the peat bed are not dissolved, but are discharged with the residue of peat after extraction.

Dynamic extraction has been proposed, e.g. in WO 92/16600, and is carried out in extractors with a stationary peat bed and a continuously flowing stream of extracting liquid. The solvent is delivered through a perforated bottom of the peat container and allowed to penetrate the peat bed in a steady and uniform way. After passing through the bed, the extract is collected above the upper level of the peat bed.

In the known extracting apparatus as covered by PCT/EP92/00535, the extracting medium was introduced into the apparatus under a certain pressure. In the practical use of the apparatus, a sort of cake has been formed near the perforated bottom plate within the peat bed due to the pressure of the peat bed, since the extractor was first loaded with peat and then the extracting medium was pumped in.

Frequently, it occurred that the initial pressure of the liquid was so high that the whole peat bed—not properly wetted—was either pushed upwards or remained dry during the extraction, because the liquid formed flow channels through the peat bed, or else the liquid moved preferably between the peat bed and the extractor walls, which phenomenon was defined as the "wall effect". Accordingly, there were serious doubts if all peat particles were really wetted by and suspended in the extracting medium due to the balance of the liquid flow rate and the solid particles' sedimentation rate. In fact, there were big portions of the peat bed in which air was entrapped and for this reason the peat particles could not sediment freely and were carried upwards with the stream of extracting fluid.

In this latter type of extractors, the main difficulties arose from the control of a steady and uniform flow of the extracting agent through the bed of peat; the "wall effect" resulted in a better soaking of peat particles with extracting solvent in the close neighbourhood of the extractor walls in comparison with the center of the bed. On the other hand, a higher speed of solvent flow is achieved in the wall region leading to unequal extraction of the desired substances and thus rendering the process less effective than desirable. Difficult de-aeration of the peat bed is the main cause for this effect.

SUMMARY OF THE INVENTION

It is therefore an object of the invention to provide an apparatus allowing a dynamic extraction, as mentioned above, which is free of the drawbacks of the known extractors, thereby providing a possibility to extract peat without destroying its natural capillary structure.

A further object of the present invention is to provide an apparatus with a stationary peat bed soaked with an extracting agent to the same extent as it is the case with natural peat beds when being soaked with water.

Another object of the invention is to provide an apparatus which can be operated in a more efficient manner than heretofore, thus resulting in higher yields.

These objects are achieved by an apparatus for extraction of peat comprising an extraction tank, a liquid extracting medium feeding pipe system and an extract outflow pipe system which is characterized in that the extraction tank comprises unperforated wall means forming an outer tank and an inner tank compartment comprising perforated walls for receiving a bed of said peat to be extracted, said feeding pipe system being in fluid communication with said inner tank compartment, and preferably being mounted to extend and to open into said inner tank compartment, while said outflow pipe system is mounted on said outer tank.

The existence of an outer tank allowing the solvent to enter the peat bed from the inside and/or outside of said inner tank compartment via at least one perforated wall of said inner tank compartment enables better settling of dispersed peat particles in the space between the inner and the outer tank so that a higher purity is achieved, thus facilitating or even avoiding further processing of the extract.

If at least two opposed walls of said inner tank compartment are perforated, the extractor may be filled to a higher level than in prior art extractors without the risk of obtaining more impurities (peat particles) in the extract. Nevertheless, the saturation of the solution will, thus, be increased.

However, if the inner tank compartment is totally surrounded by perforated walls, and, thus, provides a larger surface area for an exchange of solvent and extracted substances than it was possible with extractors of the prior art, this will result in a more intimate exchange of substances beween the solvent and the peat bed. This is due to the fact that the solvent is allowed to enter the inner tank compartment from all sides while the desired substances, after dissolution, may pass into the space between the inner tank compartment and the walls of the outer tank. In addition, the use of two tanks—one placed inside the other—eliminates the disadvantageous "wall effect" of known extractors. In consequence, a higher saturation of the extract will be achieved and the peat will be better utilized, thus leading to an improved operation of more efficiency.

While the extractors of the prior art usually had a circular cross-section, the present invention reconsiders the optimum cross-sectional configuration of an extractor. Virtually, the present invention leads to an enlarged surface area through which the exchange of substances takes place. While a variety of cross-sectional configurations of a larger surface area to volume ratio is conceivable, this must not result in too many corners from where residues of peat and mud are difficult to remove thus making it impossible to clean the inner tank compartment. Therefore, a parallelepipedic cross-section, preferably a rectangular cross-section, would constitute a good compromise, particularly one with a relatively large ratio of the dimensions in one plane to the thickness in a direction perpendicular to said plane. This results in a better and more uniform penetration of solvent into and through the peat bed than with a circular cross-section where the peripheral regions are generally in a more intimate contact with the solvent than the central region. The ratio of the smaller side in said larger plane to the thickness of the parallelepiped should preferably exceed 1.5:1 and could reach a ratio of more than 2:1, preferably more than 3:1, particularly 5:1 and more.

In the latter case of a slice-shaped inner tank compartment, the same could have two large parallel surfaces extending in a small distance from each other substantially in vertical direction and preferably centered with respect to the outer tank, while the outer tank could be divided by a central partition wall adjoining the small side of the inner tank compartment so that solvent is supplied from one side through the feeding pipe system arranged on one side of the partition wall, and is drawn off from the other side of the partition wall. With such an arrangement, it would even be conceivable that a pair of squeeze rollers form the bottom of the parallelepipedic inner tank compartment so that a supply of peat could slowly be fed from above and, after extraction could be squeezed off and discharged. This would even allow a continuous operation, although in order not to disturb the flow of the solvent, a movement of the peat bed through the extractor can only occur at low speeds, e.g. in small steps or increments. The squeeze rollers may have an elastic surface and form a seal to the bottom surface of the inner tank compartment which preferably has a width corresponding to the diameters and length of the two squeeze rollers in maximum, but in particular is still smaller. Further sealing means may be provided between the squeeze rollers and the inner tank walls.

But even with a circular (or polygonal, such as quadratic) cross-section, a preferred embodiment of the invention may provide a still more intimate contact between the solvent and the peat bed if the feeding pipe system comprises at least one feeding pipe supplying the solvent medium into a collector chamber having a plurality of orifices spaced apart for distribution of the medium within said inner tank compartment, said feeding pipe system preferably comprising at least two orifices located at different levels.

Thus, inner feeding pipes for the extracting medium may be axially arranged in a vertical position, ending about in a middle region of the inner tank compartment in a distributing collector chamber, preferably on at least two levels. According to a preferred embodiment, there are lateral pipes, e.g. extending horizontally, and out of the collectors to exhibit at least one orifice. The lateral pipes may be provided with side arms which comprise also at least one orifice.

Each inner feeding pipe may be divided into an inner section that is connected to a corresponding outer feeding pipe section. Preferably, on each outer feeding pipe section, there is a control valve allowing closing and/or regulation of flow of solvent medium for each individual feeding pipe. This may provide a better control of the flow pattern of solvent through the peat bed, since each control valve can be operated independently from the remaining valves. Moreover on each outer feeding pipe section, a flow meter may be mounted for monitoring the respective flow of solvent. In a preferred embodiment, each control valve can be manually and/or electronically operated and may, furthermore, be connected to a electronic process control unit in order to optimize feeding and extracting conditions.

In order to shorten the inoperative time required for cleaning or maintainance, it is preferred—in accordance with one embodiment of the invention—that the outer tank in its upper part has at least one, e.g. annular, protrusion on its inner wall, and giving support to a flange of the inner tank compartment. The protrusion and the flange, thereby, may form a closure of the space between the two walls with a seal being interposed, such as a gasket, between the two elements. Thus, any flow of extract along the side walls of the outer tank is stopped by the closure. Above all, in this way, the inner tank compartment can easily be removed from the outer tank to carry out cleaning or maintainance operations, thus minimizing periods of stand-still.

In accordance with another embodiment of the invention, the outflow pipe system may comprise at least one upper outlet for collecting an overflow of the extract, but preferably may have at least one intermediate and/or side outlet and/or at least one bottom outlet. In this way, the extract may be drained off, e.g. batch-wise, and may preferably be passed to a circulation tank. A set of means for controlled circulation of liquids in pipelines and the tanks of the apparatus may also be provided. Such means may comprise at least one valve and/or a circulation pump enabling a forced circulation. Said at least one valve may be manually and/or electronically operated and connected to a—preferably computer-aided—electronic process control unit.

In another embodiment, sensing probes may be installed at different levels of the inner and/or outer tank and/or on top of the apparatus in order to indicate, for instance, the actual level of the extracting liquid inside and/or any disturbance of the regular extracting process. The same probes may be connected with an electronic process control unit to enable electronic, preferably computer-aided, control of electric valves of the feeding pipe system as well as of the outflow pipe system and/or the pumps in order to optimize the extracting conditions and the operation of the extracting apparatus in general.

In any embodiment, the extraction apparatus may be equipped with additional means for optical and/or visual surveillance and process control.

In one embodiment, transparent openings such as glass windows for pressure vessels may be located on top of the apparatus and/or on any useful side of the outer tank. Such glass windows may also be equipped with inside cleaning devices such as windscreen wipers. Additionally, illumination devices may be installed inside the outer tank or on top of the apparatus such, that illumination of the inside of the extraction apparatus is possible and optical control of the inside processes is enabled.

The same task may, however, as well be accomplished by means of optical sensors connected to a visualizing and/or data processing system.

In one preferred embodiment, there is a heating device, such as a heat exchanger, for raising the temperature of the solvent (thus improving its dissolving capacity) which is mounted in the feeding line system, especially in a return line. Means for regulation or control of the temperature of the liquids fed to the extraction tank, especially of recirculated liquid, may also be provided.

A forced circulation of the extracting medium through the peat bed will ensure an intensification of the extraction. Therefore, an embodiment is preferred where the liquid flow is maintained by at least one pump (instead of a mere gravity flow). It is preferred that a type of pump is used, particularly for maintaining a recirculation of the liquid, which do not cause any pulsation of the liquids. Impeller pumps are especially suitable for this purpose. In this way, disturbance of the desired, generally steady and uniform flow may be avoided. To the same end, i.e. for intensifying extraction, the outer tank may be designed as a pressure vessel and the pipe systems comprise pressurizing means including at least one pressure pump. Said at least one pump and/or at least one pressure pump may be controlled and operated by an electronic process control unit.

Further, in any embodiment at least one safety means such as a safety valve may be mounted to the extraction apparatus in order to avoid undesired overpressure and, at the extreme, to prevent serious damage in case of operation failure.

BRIEF DESCRIPTION OF THE DRAWINGS

The present invention will be better understood when reading the following detailed description with reference to the accompanying drawings, in which:

FIG. 2a shows a preferred system of inner pipes feeding the extracting medium to a peat bed to be extracted;

FIG. 2b is a side view of an individual inner pipe having a distributing collector and horizontal lateral pipes extending therefrom;

FIG. 2c shows such lateral pipes with side arms in a top view;

DETAILED DESCRIPTION OF THE DRAWINGS

Figure 1A:
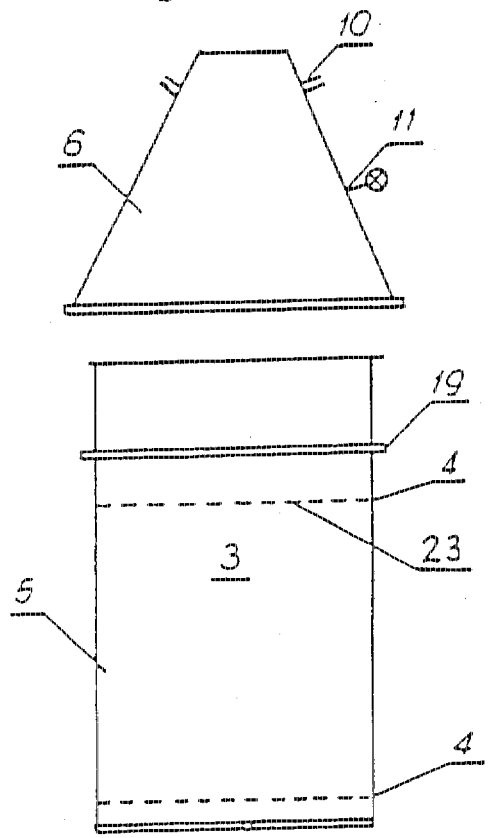
FIG. 1a and b schematically illustrate an extractor according to the invention, the left part (a) showing an exploded side view of the parts of the construction, while the right part (b) is an exploded cross-section along a vertical axis of the parts.

According to the present invention (FIGS. 1a and b) there is an outer tank 1 placed on pillars 2. The outer tank 1 may be designed as a pressure vessel in order to withstand an elevated pressure above ambient. This pressure may reach 1 bar above ambient pressure, but will usually range between 0,3 to 0,8 bar above ambient, preferably 0,5 to 0,7 bar. By pressurizing the tank 1 by at least one pump, decribed later, and/or appropriate valves, an enhanced extraction is achieved.

Within the outer tank 1 there is an inner tank compartment 3 with side walls 5 perforated at least within one region 4, as depicted at the bottom of tank compartment 3. As shown, however, there is also an upper perforated wall 23 closing the top of the inner tank above the level of the peat bed filled into this compartment 3. In this way, the peat bed can reach a higher level of the inner tank compartment as if the upper perforated wall 23 were not present, without the risk of the supernatant fluid being spoiled by peat particles which are retained by this upper perforated wall.

However, in a most preferred embodiment of the invention, the inner tank compartment 3 is totally surrounded by perforated walls, thus enabling the solvent to penetrate from all sides into the peat bed and to receive the desired extracted substances from all sides out of the bed. This will lead to an extract which is more saturated and of high purity.

As used herein, the term "perforated wall" is intended to encompass any structure providing both a retention of the peat bed and leaving openings for penetration of the solvent. Thus, the invention is not limited to the shape of such openings. For instance, the inner tank walls can be constructed in the manner of a moving bed filter or an absorber, as used for purifying gases. Such constructions often have walls in form of a plurality of successive parallel strips or lamellae, similarly to louver boards leaving a strip-like opening between each pair of wall strips. Often such boards are converging towards the bottom, and such a design could also be employed in the context of the present invention.

Preferably, the outer tank 1 is closed and sealed by an, e.g. conical, cover 6. Mounted to the cover 6 are upper overflow outlet orifices 10 and an intermediate outlet orifice 11 of an outflow pipe system. This system may also comprise a bottom outlet 7 at the lowest part and a further outlet 7a at a higher part of the bottom, as well as a side outlet 8 provided in the bottom part of the tank 1. The tank 1 may also have an intermediate outlet 9, preferably in its upper part.

While the extract can leave the tanks 1, 3 through this outflow pipe system 7–11, a top plate 12 of the cover 6 may have mounted thereon at least one inner feeding pipe 13 (FIGS. 2a and b). As shown, a plurality of coaxial, vertically extending feeding pipes 13 are arranged in order to provide for a more uniform distribution of the solvent liquid. Moreover, by providing a plurality of entrance ports or orifices the amount of flow through each of them can be reduced, thus enabling a better control of the flow which is desired at least within the inner tank compartment 3. In this way, each of the feeding pipes may have at least one feeding orifice distributing the extracting medium throughout the peat bed to be extracted.

Preferably, each one of the pipes 13 has a different length and may end in a collector chamber 14 having at least two orifices for distribution. More particularly, e.g. horizontal, lateral pipes 15 extend from the collector chambers 14 to discharge the solvent at different sites of the peat bed. The lateral pipes 15 can have assymetrically arranged side arms 16 each of which is provided with at least one feeding orifice 17 so as to result in a more uniform distribution while simultaneously further reducing the amount of flow through each of the pipes. For uniform distribution, it is preferred to have the distance between the adjacent levels of lateral pipes 15 (which are favorably arranged in at least two different levels) constant.

The lateral pipes 15 and side arms 16 on each level are arranged in such a way that there is an angular shift between the corresponding points of the side arms 16 located on two adjacent levels.

It is advantageous if the inner tank compartment 3 is hanged into the outer tank 1 in such a way that it is easily removable. The side walls 5 of the inner tank compartment 3 are spaced from the walls and bottom of the outer tank 1 to form an outer space 38 between them. This enables peat particles which are accidentally entrained with the liquid to settle within said interspace to the bottom of the outer tank without forming an impermeable mud within the peat bed which is separated by the two-tank-design according to the invention. As seen from the drawings, the inner tank compartment 3 is held in a centered relationship relative to the outer tank 1 which is the preferred configuration. However, other, asymmetric, arrangements are conceivable without departing from the scope of the invention.

Referring now again to FIG. 1b, to facilitate removal of the inner tank compartment 3 for cleaning or maintainance purposes, the outer tank 1 may have at least one protrusion 18 on its inner wall giving support to a flange 19 of the inner tank 3. The protrusion is preferably an annular one (a collar) to form a closure together with flange 19. This closure is advantageously sealed by sealing means of any known design, such as a gasket (not shown) between the two elements. However, it is to be understood that the invention is not restricted to an annular protrusion 18. Similarly at least three angularly spaced protrusions may be distributed over the inner circumference of the outer tank 1 and may be equally spaced.

The inner tank compartment 3 may be covered with a filter gauze 20 retaining any particles of peat within the inner tank compartment 3 and thus providing a purified extract. In this way, additional purifying or filtering can be reduced or even avoided. In a similar way, the upper overflow outlets 10 may, alternatively or in addition, be equipped with filters 21, and/or the intermediate outlet 11 with a filter 22.

The inner feeding pipes 13 have a stable position within the tanks 1 and 2 by means of the upper perforated plate 23 with a central opening 24 (FIG. 2a) through which the pipes 13 enter the inner tank 3. As mentioned above, the inner tank compartment 3 need not be centred with respect to the outer tank 1, and this is also the case with the opening 24, although a centred arrangement is preferred. The inner feeding pipe sections 13 are connected with respective outer feeding pipe sections 13' by means of joints positioned in the upper plate 12 of cover 6.

Figure 3:
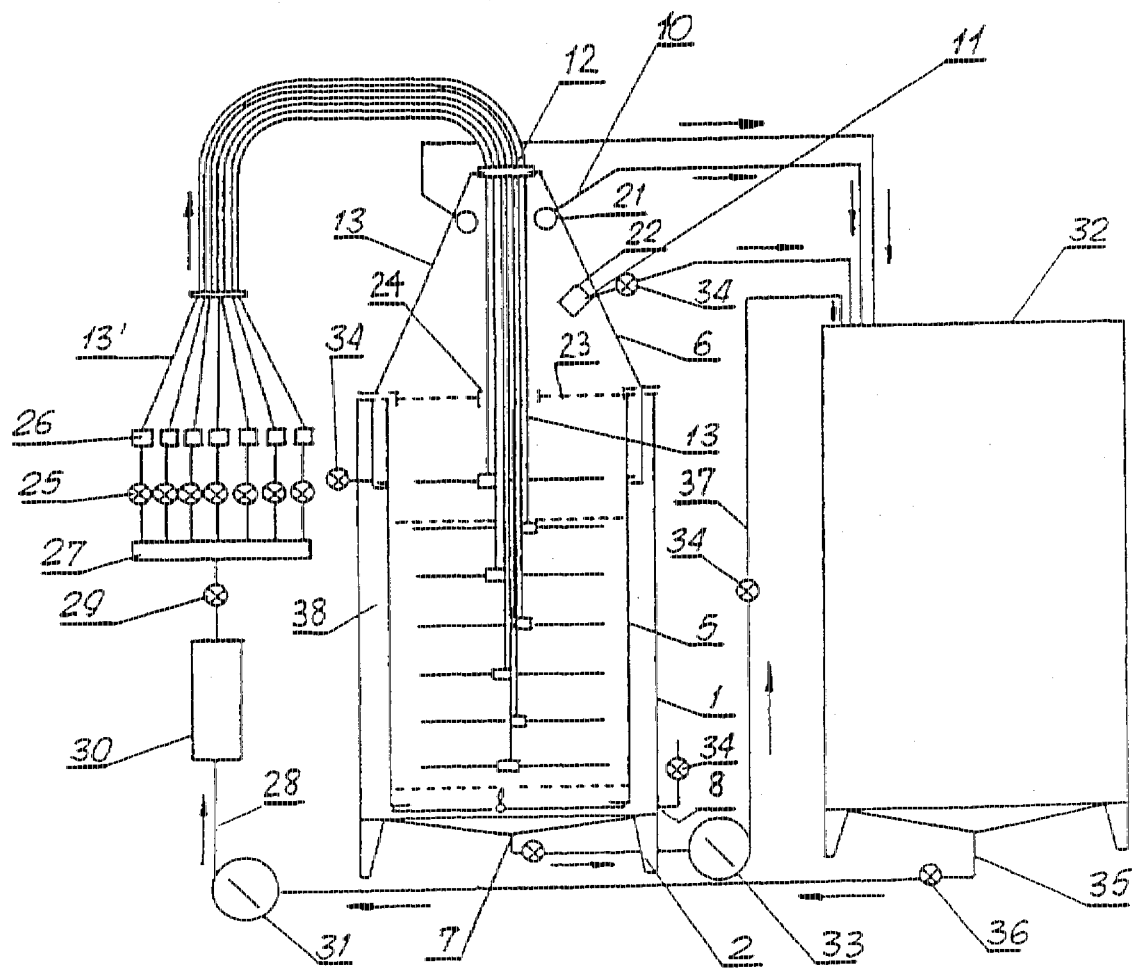
FIG. 3 shows one embodiment of the present invention with one extractor and one circulation tank with a pipe system interconnecting the two tanks.

Referring now to FIG. 3 and partly to FIG. 1, outside the extractor just described, there is a valve 25 mounted on each external feeding pipe section 13', allowing the closing or control of flow of the extracting medium independently in each pipe. For better control, flow meters 26 may also be provided. Outer feeding pipe sections 13' are connected to an entrance manifold 27 placed at the end of feeding line 28 (which is preferably a return, as described later). The feeding line 28 may be provided with a closing valve 29, but preferably contains a heating device, such as a heat exchanger 30, for raising and regulating the extraction temperature of the extracting medium fed under the pressure by means of a pressure pump 31 from a circulation tank 32.

This circulation tank 32 is continuously supplied with extract from the upper overflow outlets 10 of the tank 1. Similarly, the extract is drawn off in batches or continuously through the bottom outlet 7 in the starting phase of the extraction and through the bottom outlet 7a (FIG. 1) in the recirculation phase thereafter, the side outlet 8 and the intermediate outlet 9 which are connected with the circulation tank 32 to collect the extract from the tank 1. The intermediate outlet 11 located in the cover 6 is also connnected to the circulation tank 32. The lines connecting the outlets 8,9 and 11 with the circulation tank 32 are not shown in the drawings. In each of these lines there is a shutter valve 34, e.g. for periodically drawing extract off the tank 1 via the respective line.

In the line 37 connecting the bottom outlets 7 and 7a (FIG. 1) and the circulation tank 32, there is a pump 33. Similarly, a further pump 31 is provided in a return line 35 connecting the circulation tank 32 with the feeding pipe system 13',13. The pump 31 may also be fed with the extracting liquid from other tanks not shown in the drawings through additional lines. To this end, the pump may be connected to a mixing device (not shown) into which the afore-mentioned additional lines from other tanks open to be mixed both with each other and with the return fluid from tank 32. It is advantageous if the mixing device comprises at least one or individual adjustment facilities, such as appropriate valves, in order to adjust the mixing ratio between the liquid supplied by the different lines.

Both pumps 31,33 preferably are designed as pressure pumps building up pressure in the tank 1. This pressure, on the one hand, enhances extraction of the peat bed within the tank compartment 3, but, on the other hand, enables an easy discharge from the tank 1 into the oulet orifices 7, 7a (FIG.1), 9 and 11. It is therefore sufficient, if the pressure in the tank 1 exceeds ambient pressure only by a small amount. A pressure of 1 bar in maximum above ambient pressure is preferred. More preferably the pressure ranges from between 0,3 to 0,8 bar above ambient, and most preferably from 0,5 to 0,7 bar.

Within the return line 35, a valve 36 for cutting off the flow of the extracting medium from the circulation tank 32 may be provided. By circulating the liquid to the circulation tank 32, different modes of operation may be achieved. Either the saturation of the recirculated extract is increased by passing the liquid through the tanks 1 and 3 again and again. In this case a subvariant may be performed where a portion of the extract is drawn off some time after starting the operation to give then the desired extract continuously, while another portion is further recirculated. The portion which is drawn off will be replaced by fresh extracting liquid.

Or, the circulation tank 32 serves to collect the desired substances extracted from the peat bed and may either contain or be connected to an adsorbing bed where the substances are adsorbed to an adsorbing medium which is periodically removed to collect the substances from it. However, in most cases, the first-mentioned mode will be preferred.

Figure 4:
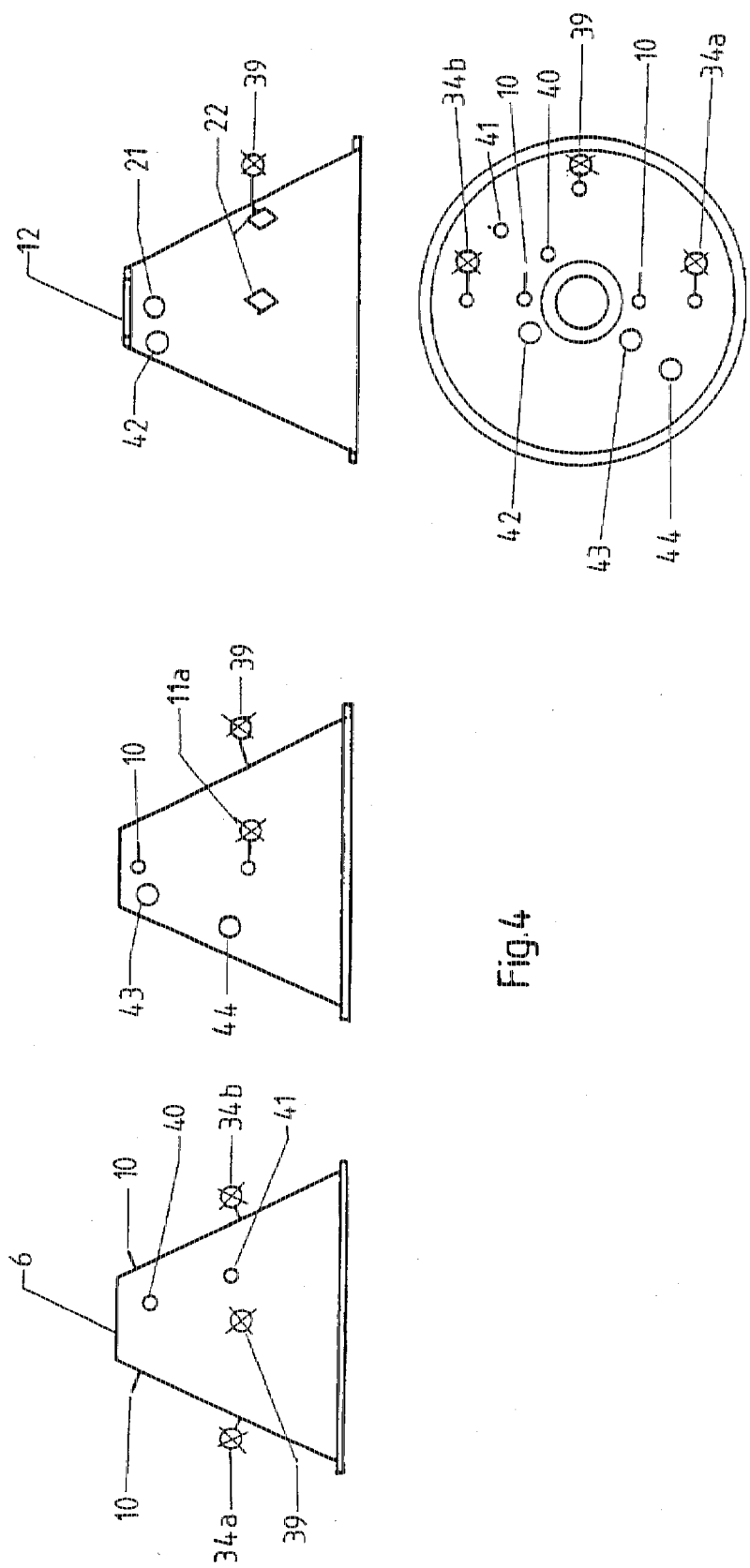
FIG. 4 shows the side and top view of another embodiment wherein a conically shaped upper part of the extracting apparatus forms a cover to the outer tank and comprises different means for liquid circulation and process control.

Referring now to FIG.4 showing another preferred embodiment of the invention, it is easily seen that at least one safety valve 39, preferably adjusted to an overpressure of less than 1.5 bar and most preferably to less than 1.0 bar, is mounted to the conical cover 6 in order to avoid any undesired overpressure and corresponding hazardous situation. Said safety valve 39 may also be protected by a filter 22 to prevent unintended emission of peat particles and/or extracting liquid to the environment. There are additional flow control means—valves 34a and 34b—regulating the efflux of the intermediate outlets 11 (see FIG.1). Valve 34a is preferably manually opened and closed whereas valve 34b is electronically operated. There are also two sensing devices 40 and 41, located at different levels on cover 6, controlling the operation of the electrical valve 34b. The upper sensor 40 opens valve 34b whereas the lower sensor 41 closes valve 34b. Both valves 34a, 34b may be protected by filters 22. The free overflow outlets 10 are also equipped with filters 21 in order to retain solid peat particles within the extractor.

In addition, there are three glass openings 42,43,44 in the conical cover 6: a lighting opening 42 for illumination of the interior of the extractor and two openings 43,44 located at different levels of cover 6, preferably at the overflow and the intermediate outlet level, for visual control of the liquid level in the extractor.

The apparatus according to the present invention is preferably operated as follows:

An exchangeable inner tank compartment 3 of the extractor is—while outside the outer tank 1—charged with raw peat to be extracted, e.g. while the tank 1 may be used with another exchangeable compartment 3 for extraction. In this way, interruption of the extracting operation due to charging and discharging the peat bed is kept to a minimum.

Having charged the inner tank 3 outside the outer tank 1, this exchangeable compartment 3 is placed into the outer pressure tank 1, and the cover 6 is fixed on top of the extractor.

Feeding pipes 13 and 13' are tightly connected by means of joints located on the upper plate 12 of the cover 6. Next, the extracting liquid medium is fed to the manifold 27, preferably under pressure. Now, the valves 25 will be opened either simultaneously or sequentially, the latter being preferred. The volume of extracting medium fed through the pipes 13 and 13' to each individual level and each orifice 17 within the peat bed is regulated in such a manner that the peat bed is saturated with extracting liquid uniformly without destroying the capillary structure of the raw peat, as closely to the natural manner of soaking peat with water at naturally occurring sites. The flow meters 26 allow a more complete control of the process of saturation of the peat bed with the extracting medium.

After the whole inner capacity of the tanks 1 and 3 is filled up with the extract and/or fresh extracting medium, the individually adjusted flow of the extracting medium out of the orifices 17 of the lateral pipes 15 and side arms 16 of the inner feeding pipe sections 13 is further maintained by a constant feeding pressure of the extracting medium by means of the pump 31. Thus, the extract will raise to be collected at the upper overflow outlets 10 in a continuous manner and will be directed to the circulation tank 32. By means of visual control via the glass openings 43 and 44 and concurrent illumination via the opening 42, the operator may easily survey the ongoing extraction process.

At the same time, the bottom outlet 7, preferably 7a, and/or side outlets 8 may be used to collect the extract periodically or continuously to supply it by means of pump 33 either to the circulation tank 32 or to a separate tank. A separate tank can be useful in case of the extract being drawn off at the lowest bottom orifice 7—e.g. during the starting phase of the extraction—, since such extract may contain more or less solid peat particles and, therefore, may be muddy and has to be purified. Consequently, the pump 33 may be designed as a mud pump, and the line which contains this pump may also comprise separation means, such as a filter. In a similar way, the line leading from the side port 8 may be provided with a pump, such as a mud pump (not shown).

From the circulation tank 32 the extract is recycled through the return line 35 to the extractor 1,3 until the peat is extracted to the desired extent.

During recirculation of the extracting medium, only a minor portion of the extracting medium is passing through the peat bed in sideward directions, e.g. from the inner feeding pipes 13 to the outer tank 1. The main stream of the extracting liquid is flowing upwards from the openings 17 and is collected as an overflow through the outlets 10, whereby solid particles may be retained by filters 21. A closure formed by an annular protrusion on the inner wall of the outer tank 1 and a flange of the inner tank 3 stop the upward flow of the extracting medium along the walls of the outer tank 1, thus eliminating the "wall effect" known from the previous extracting apparatus. The space between the inner tank 3 and the outer tank 1 is filled with extracting medium at the beginning of the extraction when the peat bed is gradually soaked with the extracting fluid, starting from the bottom parts of the bed.

When, however, the liquid level reaches the closure formed by the said protrusion and the flange, the sideward flow of the extracting medium is in fact stopped to a large extent and the next portions of extracting medium flow upwards to the overflow outlets 10.

The valves on the bottom outlets 7,7a and the side outlet 8 allow minimizing or even cutting off the sideward flow of the extracting medium through the peat bed. The plurality of the openings 17 in pipes 15 and side arms 16 ensure uniform distribution of the extracting medium within the peat bed. The extracting medium fed into the bed flows mainly upwards.

In a preferred embodiment, the sideward flow of the extracting medium is maintained at a minimum rate in order to eliminate a long lasting intimate contact of the extracting medium with the peat particles placed near the perforated walls of the inner tank 3 and thus to ensure uniform and steady extraction conditions in all regions of the peat bed.

Maintaining a varying pressure—under which the liquid is fed to the individual feeding pipes 13 having their openings on different levels and controlling the flow through the side and bottom outlets, preferably by manually and/or electronically controlled valves—contributes essentially to a steady and uniform upward flow of the liquid and ensures that the whole peat bed is soaked thoroughly and uniformly with the extracting medium. If the pressure would be maintained the same in all feeding pipes 13, the top layers of the peat bed would be carried upwards along with the flow of the extracting medium, since the hydrostatic pressure in the top layers of the bed is lower than in the bottom layers of the peat bed.

The pressure under which the extracting medium is fed to the bed is adjusted experimentally in such a way that the upward flow is prevailing and that the natural capillary structure of the peat is not destroyed.

When the desired level of saturation is achieved, the valves 25 may be opened more so that the volume of the extracting medium fed to the different levels of the peat bed is gradually increased. Preferably, this is not done with all valves 25 simultaneously, but the increase of flow of extracting medium is started at the lowest level. This will result in an increase of movement of peat particles within the extracting medium and will, in addition, increase the saturation of the extract with substances extracted from peat.

The above way of operation results in a uniform and "precise" extraction of the peat. Furthermore, in combination with the constructional feature of the inner tank 3, it allows easy discharge of the extracted peat from the inner tank 3 and the extracting apparatus as a whole.

After completion of the extraction process, the extract is completely drained off from the extractor, first through the intermediate outlets 11 and 9, and then through the side outlet 8 and bottom outlets 7a and 7. The extracted peat bed may be washed out in the next stage with a portion of fresh extracting medium or water, by means of feeding the respective washing medium from the respective tank (not shown on the drawings) through pump 31 to collector 27 and further to the peat bed in the same manner as described before. Alternatively, the inner tank compartment 3 may be removed from the outer tank 1 in order to wash the peat contained therein externally so that meanwhile a freshly charged compartment 3 may be inserted into the extractor 1.

Figure 1B:
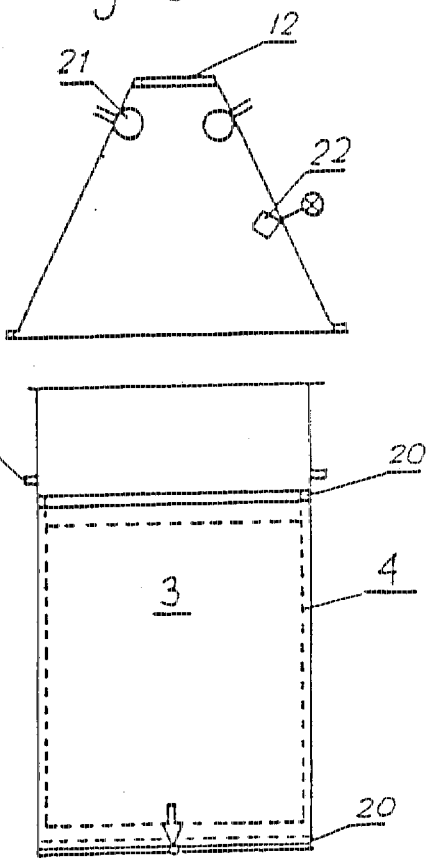

In one practical embodiment, the bottom of the inner tank is not perforated whereas the side walls are perforated in the area between the dashed lines 4 in FIG. 1a. In such a preferred embodiment, the bottom plate of the inner tank is mounted to the side walls through a hinge and can be opened to discharge the extracted peat from the inner tank. The discharge of the extracted peat is preceded by a separation of the extracting medium from the bed. This is done gradually by a sequential opening of the intermediate outlets 11,9, side outlet 8 and bottom outlets 7a and 7. When the extracting medium is collected through the bottom outlet 7a and/or 7, the perforated side walls of the inner tank 3 allow almost complete drainage of the extract from the peat bed which is not so easily achieved in the previous extraction apparatus.

According to needs, the extracting medium or washing medium may either be heated (or even cooled) in a heat exchanger 30, in order to achieve best possible use of the peat raw material. By heating, the extractive capacity of the solvent is, of course, increased. However, some of the desired substances may be sensitive to too much heat so that excessive heating should be avoided and even cooling may be required.

In the most preferred embodiment, the extracting apparatus is equipped with at least one safety valve (pressure relief valve) 39 on top of the extractor, preferably mounted to the conical cover 6, and intended to avoid undesired overpressure and subsequent hazardous situations upon unexpected operation failure.

What is claimed is:

1. An apparatus for the extraction of peat comprising:
   unperforated wall means forming an outer tank;
   an inner tank compartment having at least one perforated wall, for receiving a bed of said peat to be extracted;
   a feeding pipe system for liquid extracting medium, said feeding pipe system extending and opening into said inner tank compartment down to a level between bottom and top of said inner tank compartment that enables feeding said extracting medium from within said bed of said peat and further enables a mainly upward flow direction of said extracting medium; and
   an extract outflow pipe system mounted on said outer tank outside said inner tank compartment, including at least one outlet opening.

2. An apparatus according to claim 1 wherein all walls of said inner tank compartment are perforated.

3. An apparatus according to claim 1 wherein said feeding pipe system comprises at least one feeding pipe supplying said extracting medium into a collector chamber having a plurality of orifices spaced apart, and at least one distributing pipe extending sidewards to said feeding pipe and having at least one orifice through which said extracting medium is fed into the peat bed within said inner tank compartment.

4. An apparatus according to claim 3 wherein said at least one feeding pipe is arranged in a vertical direction and said at least one distributing pipe extends horizontally to said feeding pipe.

5. An apparatus according to claim 3, wherein said distributing pipe is further provided with at least one side arm having another orifice for feeding said extracting medium into the peat bed.

6. An apparatus for the extraction of peat comprising:
   unperforated wall means forming an outer tank;
   an inner tank compartment having at least one perforated wall, for receiving a bed of said peat to be extracted;
   a feeding pipe system for liquid extracting medium, said feeding pipe system extending and opening into said inner tank compartment; and
   an extract outflow pipe system mounted on said outer tank outside said inner tank compartment, including at least one outlet opening;
   wherein said feeding pipe system comprises at least one feeding pipe with two orifices located at different levels.

7. An apparatus for the extraction of peat comprising:
   unperforated wall means forming an outer tank;
   an inner tank compartment having at least one perforated wall, for receiving a bed of said peat to be extracted;
   a feeding pipe system for liquid extracting medium, said feeding pipe system extending and opening into said inner tank compartment; and
   an extract outflow pipe system mounted on said outer tank outside said inner tank compartment, including at least one outlet opening;
   wherein said feeding pipe system comprises at least one feeding pipe supplying said extracting medium into a collector chamber, which collector chamber has a plurality of orifices spaced apart for distribution of said extracting medium within said inner tank compartment.

8. An apparatus for the extraction of peat comprising:
   unperforated wall means forming an outer tank;
   an inner tank compartment having at least one perforated wall, for receiving a bed of said peat to be extracted;
   a feeding pipe system for liquid extracting medium, said feeding pipe system extending and opening into said inner tank compartment; and
   an extract outflow pipe system mounted on said outer tank outside said inner tank compartment, including at least one outlet opening;
   wherein said feeding pipe system comprises at least two feeding pipes extending substantially in vertical direction;
   said outer tank is a pressure vessel; and
   said feeding pipe system or said outflow pipe system comprises pressurizing means including at least one pressure pump.

9. An apparatus according to claim 8 wherein said at least two feeding pipes are arranged in coaxial relationship.

10. An apparatus for the extraction of peat comprising:
    unperforated wall means forming an outer tank;
    an inner tank compartment having at least one perforated wall, for receiving a bed of said peat to be extracted;
    a feeding pipe system for liquid extracting medium, said feeding pipe system extending and opening into said inner tank compartment; and
    an extract outflow pipe system mounted on said outer tank outside said inner tank compartment, including at least one outlet opening,
    wherein said feeding pipe system comprises at least one inner feeding pipe section located inside said outer tank and a corresponding outer feeding pipe section located outside said outer tank, said sections being connected to each other, each outer feeding pipe section including a control valve to enable an independent operation of each valve for flow regulation of said extracting medium.

11. An apparatus according to claim 10 wherein said each outer feeding pipe section further comprises a flow meter.

12. An apparatus according to claim 10 wherein said control valve of said each outer feeding pipe section is operated under electronic process control.

13. An apparatus for the extraction of peat comprising:
unperforated wall means forming an outer tank;
an inner tank compartment having at least one perforated wall, for receiving a bed of said peat to be extracted;
a feeding pipe system for liquid extracting medium, said feeding pipe system extending and opening into said inner tank compartment; and
an extract outflow pipe system mounted on said outer tank outside said inner tank compartment, including at least one outlet opening;
wherein said unperforated wall means of said outer tank comprises in its upper part at least one inner protrusion and said inner tank compartment comprises flange means projecting outwardly to engage said protrusion to be supported by the latter, said protrusion and said flange means forming a closure between them.

14. An apparatus according to claim 13 wherein said inner protrusion is annular and said closure is formed by means of a gasket.

15. An apparatus for the extraction of peat comprising:
unperforated wall means forming an outer tank;
an inner tank compartment having at least one perforated wall, for receiving a bed of said peat to be extracted;
a feeding pipe system for liquid extracting medium, said feeding pipe system extending and opening into said inner tank compartment; and
an extract outflow pipe system mounted on said outer tank outside said inner tank compartment, including at least one outlet opening;
wherein said outer tank comprises in its upper part a conical cover, said cover further comprising at least one feeding pipe of said feeding pipe system and at least one outflow pipe of said outflow pipe system mounted thereto.

16. An apparatus for the extraction of peat comprising:
unperforated wall means forming an outer tank;
an inner tank compartment having at least one perforated wall, for receiving a bed of said peat to be extracted;
a feeding pipe system for liquid extracting medium, said feeding pipe system extending and opening into said inner tank compartment; and
an extract outflow pipe system mounted on said outer tank outside said inner tank compartment, including at least one outlet opening;
wherein said outflow pipe system comprises at least one upper outlet for periodically or continuously collecting an overflow of peat extract and at least one second outlet located at said outer tank at a level below said upper outlet for draining off said peat extract from said peat.

17. An apparatus according to claim 16 wherein said outflow pipe system comprises two bottom outlets, one of them located at the lowest point of the outer tank for draining off either muddy material formed by sedimented peat particles and the other one located at a slightly higher point of said outer tank, for draining off substantially particle free supernatant.

18. An apparatus according to claim 16 wherein said at least one second outlet is selected from a bottom outlet, a side outlet located at the bottom part of the outer tank, and an intermediate outlet located at the upper part of the outer tank.

19. An apparatus for the extraction of peat comprising:
unperforated wall means forming an outer tank;
an inner tank compartment having at least one perforated wall for receiving a bed of said peat to be extracted;
a feeding pipe system for liquid extracting medium, said feeding pipe system extending and opening into said inner tank compartment;
an extract outflow pipe system mounted on said outer tank outside said inner tank compartment, including at least one outlet opening; and
a circulation tank connected to said outflow pipe system for receiving peat extract; and
means for maintaining a controlled circulation of liquid between said inner tank compartment, said outer tank and said circulation tank, said means including a return pipe.

20. An apparatus according to claim 19 wherein said means for maintaining a controlled circulation of liquid further comprises at least one valve or at least one circulation pump in said return pipe.

21. An apparatus according to claim 19 wherein said means for maintaining a controlled circulation of liquid further comprise at least one valve and at least one circulation pump enabling a forced circulation of liquid.

22. An apparatus according to claim 19 wherein said means for maintaining a controlled circulation of liquid further comprises at least one valve or at least one pump in said outflow pipe system and another one in said return pipe, which is of a pulsation-free type.

23. An apparatus according to claim 22 wherein said at least one pulsation-free pump is an impeller pump.

24. An apparatus according to claim 19 wherein said means for maintaining a controlled circulation of liquid comprises at least one valve or at least one pump, either of which is manually or electronically operated.

25. An apparatus according to claim 24 wherein said at least one valve or said at least one pump is operated under electronic process control.

26. An apparatus for the extraction of peat comprising:
unperforated wall means forming an outer tank;
an inner tank compartment having at least one perforated wall, for receiving a bed of said peat to be extracted;
a feeding pipe system for liquid extracting medium, said feeding pipe system extending and opening into said inner tank compartment;
an extract outflow pipe system mounted on said outer tank outside said inner tank compartment, including at least one outlet opening; and
at least one sensing means for metering liquid levels inside said apparatus.

27. An apparatus according to claim 26 wherein said apparatus comprises two of said at least one sensing means, said sensing means being installed at different levels on top of the outer tank.

28. An apparatus for the extraction of peat comprising:
unperforated wall means forming an outer tank;

an inner tank compartment having at least one perforated wall, for receiving a bed of said peat to be extracted;

a feeding pipe system for liquid extracting medium, said feeding pipe system extending and opening into said inner tank compartment;

an extract outflow pipe system mounted on said outer tank outside said inner tank compartment, including at least one outlet opening;

a circulation tank connected to said outflow pipe system for receiving peat extract;

means for maintaining a controlled circulation of said liquid between said inner tank compartment, said outer tank, and said circulation tank, said means including a return pipe and at least one valve or at least one pump; and at least one sensing means for metering liquid levels inside said apparatus;

wherein at least one of said means for maintaining a controlled circulation of liquid is controlled by said at least one sensing means.

29. An apparatus for the extraction of peat comprising:

unperforated wall means forming an outer tank;

an inner tank compartment having at least one perforated wall, for receiving a bed of said peat to be extracted;

a feeding pipe system for liquid extracting medium, said feeding pipe system extending and opening into said inner tank compartment;

an extract outflow pipe system mounted on said outer tank outside said inner tank compartment, including at least one outlet opening; and at least one arrangement selected from the group consisting of heating means arranged for heating said liquid extracting medium prior to entering said inner tank compartment through said feeding pipe system, transparent openings for visual process control, means for optical sensoring of the interior to enable optical process control, and at least one outlet or outflow pipe of said outflow pipe system equipped with at least one filter for retaining peat particles within said apparatus for the extraction of peat.

30. An apparatus according to claim 29 wherein said heating means include a heat exchanger.

31. An apparatus according to claim 29 further comprising a return pipe which connects said apparatus with a circulation tank, said return pipe supplying said liquid extraction medium into a manifold for distribution to said feeding pipe system, and wherein said heating means are mounted to said return pipe.

32. An apparatus for the extraction of peat, which apparatus is suitable for operation under pressure, comprising:

unperforated wall means forming an outer tank;

an inner tank compartment having at least one perforated wall, for receiving a bed of said peat to be extracted;

a feeding pipe system for liquid extracting medium, said feeding pipe system extending and opening into said inner tank compartment;

an extract outflow pipe system mounted on said outer tank outside said inner tank compartment, including at least one outlet opening; and at least one safety valve to avoid undesired overpressure.

33. An apparatus according to claim 32 wherein said safety valve is equipped with a filter to avoid unintended emission of material contained in said apparatus.

* * * * *

UNITED STATES PATENT AND TRADEMARK OFFICE
CERTIFICATE OF CORRECTION

PATENT NO. : 5,713,967
DATED : February 3, 1998
INVENTOR(S) : Hamerlinski

It is certified that error appears in the above-identified patent and that said Letters Patent is hereby corrected as shown below:

On the title page, item [30] should read as follows:

Foreign Application Priority Data
June 21, 1993 [PL] Poland 299418

Signed and Sealed this

Seventh Day of July, 1998

Attest:

BRUCE LEHMAN

Attesting Officer        Commissioner of Patents and Trademarks